United States Patent
Yoon et al.

(10) Patent No.: US 11,699,242 B2
(45) Date of Patent: Jul. 11, 2023

(54) SYSTEM AND METHOD FOR DIGITAL HOLOGRAM SYNTHESIS AND PROCESS USING DEEP LEARNING

(71) Applicant: ELECTRONICS AND TELECOMMUNICATIONS RESEARCH INSTITUTE, Daejeon (KR)

(72) Inventors: Min Sung Yoon, Daejeon (KR); Byung Gyu Chae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 242 days.

(21) Appl. No.: 17/180,125

(22) Filed: Feb. 19, 2021

(65) Prior Publication Data

US 2021/0264628 A1    Aug. 26, 2021

(30) Foreign Application Priority Data

Feb. 25, 2020 (KR) .......... 10-2020-0022989
Feb. 10, 2021 (KR) .......... 10-2021-0019173

(51) Int. Cl.
*G06T 7/536* (2017.01)
*G06T 7/571* (2017.01)
(Continued)

(52) U.S. Cl.
CPC .............. *G06T 7/536* (2017.01); *G06F 17/14* (2013.01); *G06N 3/08* (2013.01); *G06T 7/571* (2017.01);
(Continued)

(58) Field of Classification Search
CPC ......... G06T 19/006; G06T 2207/20084; G06T 1/20; G06T 2207/20081;
(Continued)

(56) References Cited

U.S. PATENT DOCUMENTS

| 7,950,802 B2 | 5/2011 | Schwerdtner et al. |
| 2019/0196400 A1 | 6/2019 | Chang |

(Continued)

FOREIGN PATENT DOCUMENTS

| KR | 10-2014-0002848 A | 1/2014 |
| KR | 10-2019-0083583 A | 7/2019 |

(Continued)

OTHER PUBLICATIONS

Liu CL, Shih KT, Huang JW, Chen HH. Light field synthesis by training deep network in the refocused image domain. IEEE Transactions on Image Processing. May 11, 2020;29:6630-40. (Year: 2020).*

(Continued)

*Primary Examiner* — Xiao M Wu
*Assistant Examiner* — Scott E Sonners
(74) *Attorney, Agent, or Firm* — LRK Patent Law Firm

(57) ABSTRACT

A system and method for hologram synthesis and processing capable of synthesizing holographic 3D data and displaying (or reconstructing) a full 3D image at high speed using a deep learning engine. The system synthesizes or generates a digital hologram from a light field refocus image input using the deep learning engine. That is, RGB-depth map data is acquired at high speed using the deep learning engine, such as a convolutional neural network (CNN), from real 360° multi-view color image information and the RGB-depth map data is used to produce hologram content. In addition, the system interlocks hologram data with user voice recognition and gesture recognition information to display the hologram (Continued)

data at a wide viewing angle and enables interaction with the user.

20 Claims, 5 Drawing Sheets

(51) Int. Cl.
*G06F 17/14* (2006.01)
*G06N 3/08* (2023.01)
*G06T 15/20* (2011.01)

(52) U.S. Cl.
CPC .. *G06T 15/205* (2013.01); *G06T 2207/10052* (2013.01)

(58) Field of Classification Search
CPC . G06T 2207/10028; G06T 7/50; G06T 17/00; G06T 2207/10052; G06T 9/002; G06T 3/4046; G06T 15/00; G06T 15/02; G06N 3/08; G06N 3/0454; G06N 20/00; G06N 7/005; G02B 27/017; G02B 2027/0174; G02B 30/27; G02B 27/0037; G02B 27/01; G06V 10/82; G06V 20/20; G06V 10/764; G06V 20/64; G03H 1/0005; G03H 1/0443; G03H 1/0866; G03H 1/08; G03H 1/04
See application file for complete search history.

(56) References Cited

U.S. PATENT DOCUMENTS

| | | | | |
|---|---|---|---|---|
| 2019/0294108 | A1* | 9/2019 | Ozcan | ............... G06N 3/02 |
| 2019/0332055 | A1 | 10/2019 | Yoon | |
| 2021/0232090 | A1* | 7/2021 | Tagawa | ............... G06T 7/50 |

FOREIGN PATENT DOCUMENTS

| | | |
|---|---|---|
| KR | 10-2019-0108003 A | 9/2019 |
| KR | 10-2125795 B1 | 6/2020 |

OTHER PUBLICATIONS

Hazirbas C, Soyer SG, Staab MC, Leal-Taixe L, Cremers D. Deep depth from focus. InAsian conference on computer vision Dec. 2, 2018 (pp. 525-541). Springer, Cham. (Year: 2018).*

Wu Y, Rivenson Y, Zhang Y, Wei Z, Giinaydin H, Lin X, Ozcan A. Extended depth-of-field in holographic imaging using deep-learning-based autofocusing and phase recovery. Optica. Jun. 20, 2018;5(6):704-10. (Year: 2018).*

Lee J, Jeong J, Cho J, Yoo D, Lee B, Lee B. Deep neural network for multi-depth hologram generation and its training strategy. Optics Express. Aug. 31, 2020;28(18):27137-54. (Year: 2020).*

Tomoyoshi Shimobaba et al., "Convolutional neural network-based regression for depth prediction in digital holography" 2018 IEEE 27th International Symposium on Industrial Electronics (ISIE), Feb. 2018.

* cited by examiner

SYSTEM AND METHOD FOR DIGITAL HOLOGRAM SYNTHESIS AND PROCESS USING DEEP LEARNING

CROSS-REFERENCE TO RELATED APPLICATIONS

This application claims priority to and the benefit of Korean Patent Applications No. 10-2020-0022989 filed on Feb. 25, 2020 and No. 10-2021-0019173 filed on Feb. 10, 2021, disclosures of which are incorporated herein by reference in their entirety.

BACKGROUND

1. Field of the Invention

The present invention relates to a three-dimensional image and content processing, deep learning, and hologram synthesis technology, and more particularly, to a technology for generating a digital hologram from a light field refocus image input.

2. Description of Related Art

A holographic display technology is a technology of representing an object three-dimensionally in a three-dimensional space and is an ideal fully realistic three-dimensional display technology. Specifically, the holographic display technology is a technology which provides the same effect as an object actually existing in the human eye by reproducing a wave-front generated by the given object as it is.

Recently, with the development of three-dimensional (3D) display technology, objects are expressed with a perfect parallax and depth, and as a result, there are no symptoms such as eye fatigue and dizziness caused by accommodation-convergence mismatch. Furthermore, the holographic display technology is ultimately being developed as the 3D display technology because the holographic display technology allows a viewer to view natural images like when viewing the real world as a viewpoint moves. However, there are some limitations in implementing this holographic display technology.

Specifically, the conventional computer-generated hologram (CGH) that synthesizes digital hologram content from 3D data, such as point cloud, RGB-depth map data, etc., by means of mathematical operation has limitations in that it is particularly difficult to implement real-time image processing and optical reconstruction because a very large amount of data is required to produce 360° video content for holography based on various real objects or CG.

Therefore, due to the nature of hologram data, the load on the computational throughput is high and the time required in the mathematical calculation process becomes a significant burden. Therefore, a method of reconstructing an image based on the previously generated content is used, and thus, content is being produced in which a viewer is bound to view an image in a passive posture. Therefore, there is a need to develop a high-speed hologram content production technology that enables real-time interaction experiences between a user and content.

SUMMARY OF THE INVENTION

To overcome the limitations of the conventional computer-generated hologram (CGH) method described above, the present disclosure is directed to providing a method for producing holographic content capable of synthesizing holographic 3D data for holography and displaying (or reconstructing) a full three-dimensional (3D) image at high speed using a deep learning method.

In order to solve the above problem, the present invention synthesizes or generates a digital hologram from a light field refocus image input by using a deep learning engine. In other words, the present invention acquires RGB-depth map data at high speed using a deep learning engine, such as a convolutional neural network (CNN), from real 360° multi-view color image information and uses the RGB-depth map data to produce hologram content. In addition, the present invention interlocks hologram data with user voice recognition and gesture recognition information to display the hologram data at a wide viewing angle and enables interaction with the user.

The configurations and operations of the present invention described above will be further clarified through specific embodiments described together with the drawings.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
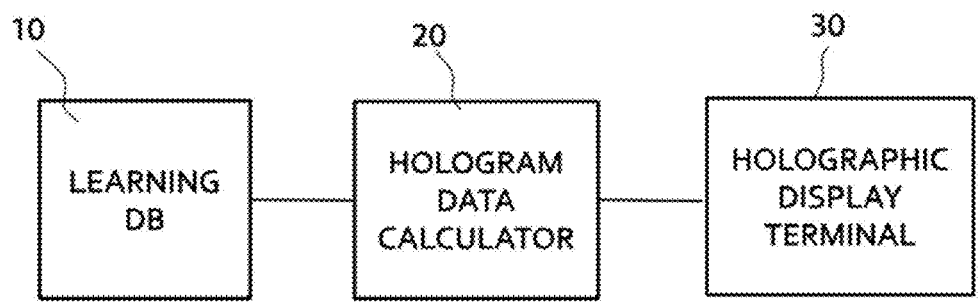
FIG. 1 is a configuration diagram of a hologram generation system according to an embodiment of present invention.

Advantages and features of the present invention and methods accomplishing them will become apparent from embodiments described in detail with reference to the accompanying drawings. However, the present invention is not limited to the embodiments disclosed below and may be implemented in various forms. The embodiments are provided to make contents of the present invention thorough and to completely inform the scope of the invention to those with ordinary knowledge in the technical field to which the present invention belongs. Therefore, the present invention will be defined by the scope of the appended claims. On the other hand, terms used in the present specification are for explaining the embodiments rather than limiting the present invention. Unless otherwise stated, a singular form includes a plural form in the present specification. The terms "comprise" or "comprising" used herein do not preclude the presence or addition of one or more other elements, steps, operations, and/or devices other than stated elements, steps, operations, and/or devices.

Hereinafter, exemplary embodiments of the present invention will be described in detail with reference to the accompanying drawings. In adding reference numerals to components of each drawing, even though the same components are shown on different drawings, the same components are assigned the same reference numerals when possible, and in describing the present invention, when a detailed description of related known configurations or functions may obscure the subject matter of the present invention, the detailed description thereof will be omitted.

<Theoretical Background for Hologram Calculation and Deep Learning Method>

As an operation method of high-speed hologram generation in the present invention, the following equations of computer-generated hologram (CGH) calculation based on fast-Fourier transformation (FFT) may be used with an RGB-depth map as input information. A case is considered in which, when a three-dimensional (3D) space containing a 3D scene is divided into multiple layers, a hologram plane (H), a viewer's observing view-window plane (VW), and each hierarchical layer is cut to be parallel to each other. In addition, point clouds distributed almost continuously are allocated to the nearest layer. Then, a discontinuous Fourier transform is performed using an FFT algorithm to calculate a complex value field on the hologram plane.

$$U_{VW}(u,v) = \sum_{j=1}^{m} \frac{e^{\frac{\pi j}{\lambda d_i}(u^2+v^2)}}{j\lambda d_i} \frac{f}{d_i} \iint U_i(x_i, y_i) e^{\frac{-2\pi j}{\lambda d_i}(ux_i+vy_i)} dx_i dy_i,$$

$$U_H(x,y) = \frac{j}{\lambda f} \iint U_{VW}(u,v) e^{-\frac{\pi j}{\lambda f}(u^2+v^2)} e^{\frac{2\pi j}{\lambda f}(xu+yv)} du dv$$

In the above equation, (u,v), $(x_i,y_i)$, $U_i$, f, $\lambda$, and $d_i$ represent the viewer's observing view-window plane, an i-th layer of the 3D scene, an object field of the i-th layer, a focal length of the field lens, a wavelength of illumination light, and a viewing distance from the hologram plane, respectively. The RGB-depth map-based CGH calculated in this way may reconstruct the original 3D scene in space, and a viewer who observes with his or her eyes at a view-window position may see an optically reconstructed 3D scene.

Meanwhile, another useful representative algorithm for computer hologram synthesis is a Gerchberg-Saxton (GS) algorithm. The GS algorithm is based on an iterative Fourier transform algorithm (IFA or IFT) capable of calculating a phase distribution on the other side by iteratively performing Fourier transform/inverse Fourier transform processes when there is a known light field intensity in each optical plane through a propagation function such as the Fourier transform described above and when a known phase distribution is given on one side.

Meanwhile, a deep learning model that can be trained while maintaining spatial information of an image is a convolutional neural network (CNN). The CNN has the following differentiation compared to the existing Fully-Connected neural network: maintenance of a shape of input/output data of each layer; efficient recognition of features from adjacent images while maintaining the spatial information of the image; extraction of features of image and learning them by using multiple filters; a pooling layer that collects and reinforces features extracted from the image; much fewer number of learning parameters than that of a normal neural network by using the filter as a shared parameter; and the like.

Multi-view color images may be easily captured by a general mobile device and have been archived in various types of content until now. The CNN method, which is easily used to extract a depth map from multi-view color image data, may be divided into a part of feature extraction and a part of classification. The feature extraction area is configured in a form in which a convolution layer and the pooling layer are stacked in multiple layers. The convolution layer is an essential element that reflects an activation function after applying a filter to input data. The pooling layer located next to the convolutional layer is an optional layer. As the last stage of the CNN, a fully-connected layer for image classification is added. A flatten layer, in which image type data is generated in an array form, is located between the part that extracts the features of the image and the part that classifies the image. In the CNN, the filter circulates the input data to extract the features of the image, a convolutional product is calculated, and a feature map is generated using the calculation result. In the convolution layer, the shape of the output data is changed according to a filter size, stride, application of padding, and a max pooling size.

<Configuration and Operation of Present Invention>

As illustrated in FIG. 1, the hologram generation system according to the embodiment of the present invention includes a learning database (DB) 10 that is constructed with input learning data composed of a light field (LF) refocus image and output learning data composed of a CGH; a hologram data calculator 20 that synthesizes hologram data by training a deep learning engine using the learning DB; and a holographic display terminal 30 that receives the hologram data from the hologram data calculator 20 to display the received hologram data as hologram content.

The input learning data of the learning DB 10 is an LF refocus complex amplitude image converted from the LF refocus image, and the output learning data is a CGH generated based on an RGB-depth map. The hologram data calculator 20 uses the deep learning engine, such as CNN, to learn the input learning data and the output learning data of the learning DB 10, thereby calculating the CGH. The holographic display terminal 30 displays the hologram content at a wide viewing angle, recognizes a voice and a gesture of a user, and interlocks with the recognized information to interact with the user.

Figure 2:
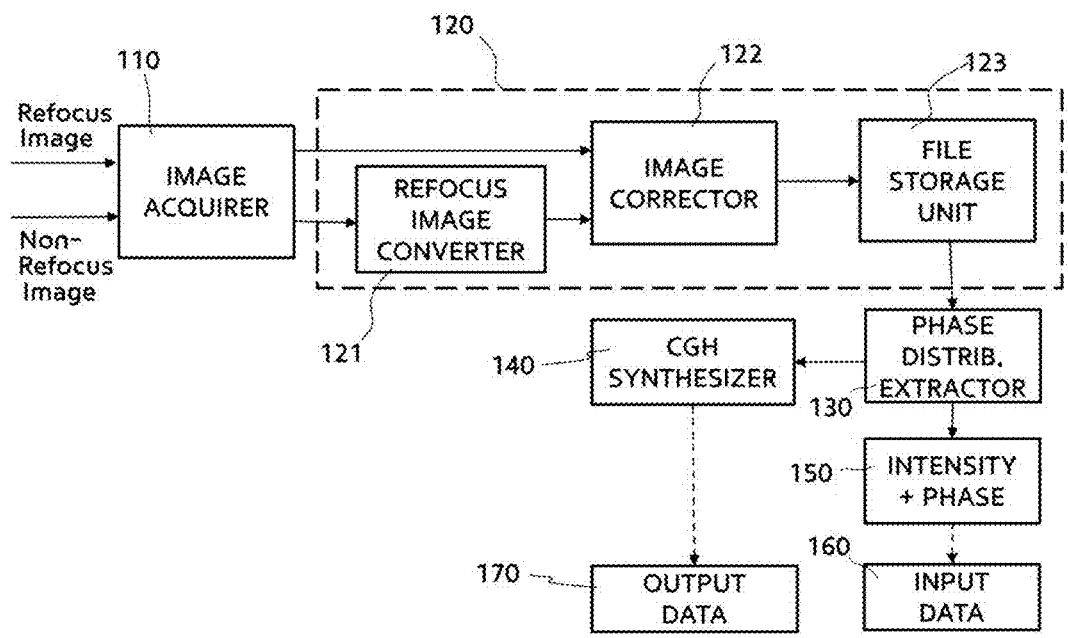
FIG. 2 is a configuration diagram of a system for constructing a learning database (DB) (10)

FIG. 2 is a configuration diagram of a system for constructing the learning DB 10. This system is largely composed of an image acquirer 110 and an image processor.

The image acquirer 110 acquires data capable of providing 3D information of a selected scene or object, a multi-view RGB color images, or the like. Here, the image data to be acquired includes single view color image or multi-view color image data that is acquired by a camera based on a photographing (actual object) method or a camera based on a computer graphic (CG) method.

The image processor may be configured in three stages as follows.

1) First Image Processor 120

The color image data obtained by the image acquirer 110 may be an image acquired in a refocusing state (refocus image) or may not be in a refocusing state (non-refocus image). When the acquired image data is a non-refocus image, a refocus image converter 121 for obtaining an image in a refocusing state (refocus image) from the multi-view RGB color original image acquired by the image acquirer 110 is included in a first image processor 120.

In addition, the first image processor 120 includes an image corrector 122 that corrects the direction, position, features, and the like of an object in a selected area of the refocus image acquired by the image acquirer 110 and the image converted by the refocus image converter 121; and a file storage unit 123 that stores the corrected image as a file in a specific desired format.

2) The second image processor is a phase distribution extractor 130 that extracts a phase distribution to be used to generate the input data (i.e., input learning data) of the learning DB 10 from the image output from the first image processor 120. (Here, the phase distribution extraction is synonymous with phase retrieval.) The reason for performing the phase distribution extraction or phase retrieval is that the refocus image captured by an LF camera, to generate input data for constructing the hologram generation learning DB 10 based on the LF refocus image, has only intensity information. For the phase distribution extraction or the phase retrieval, the iterative Fourier transform (IFT) algorithm or the deep learning engine may be used. Specifically, there are various conventional algorithms such as GS, error reduction, and Hybrid Input-Output (HIO) among the IFT algorithm that can be used to extract the phase distribution from the LF refocus input image. Also, the phase retrieval can be obtained with the deep learning engine 210 as illustrated in FIG. 1.

3) A third image processor is a CGH synthesizer 140 that synthesizes the CGH to generate the output data (i.e., output learning data) of the learning DB 10. The CGH as the output data is required to train the deep learning engine 210. This CGH synthesizer 140 may synthesize the CGH by inputting the format in the RGB-depth form using the RGB-depth map-based FFT algorithm or the like to generate the output data of the learning DB 10.

4) As described above, the LF refocus complex amplitude image 150, in which the intensity information included in the LF refocus image and the phase distribution obtained by the phase distribution extractor 130 is combined, is generated as the input data 160 of the learning DB 10, and the CGH synthesized by the CGH synthesizer 140 is generated as the output data 170, and thus the learning DB 10 may be constructed.

Figure 3:
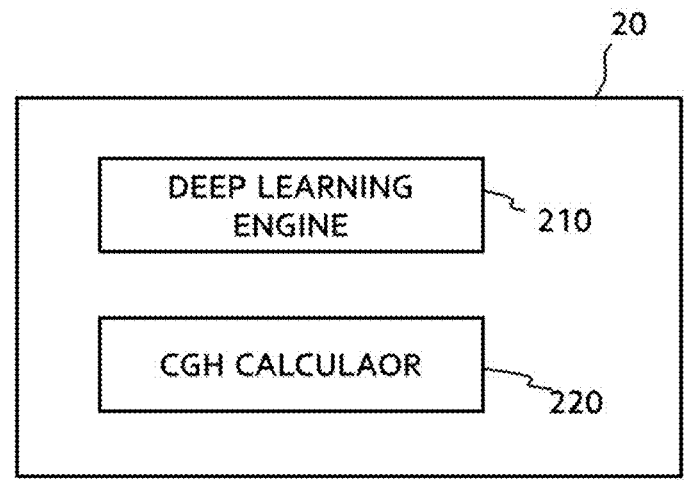
FIG. 3 is a configuration diagram of a hologram data calculator (20)

Next, the hologram data calculator 20 will be described with reference to FIG. 3. The hologram data calculator 20 includes a deep learning engine 210 such as a CNN that learns the input and output data of the learning DB 10 and a CGH calculator 220 that calculates holographic data using the trained deep learning engine 210.

The deep learning engine 210 designs and learns the CNN-based algorithm using the learning DB 10. During learning, the intensity image and the phase image are used together as the input data (that is, a refocus complex amplitude image). The CGH calculator 220 generates complex value hologram data for the input LF refocus image using the trained deep learning engine 210. A memory (not illustrated) for storing CGH data generated by this process may be included in the hologram data calculator 20.

Figure 4:
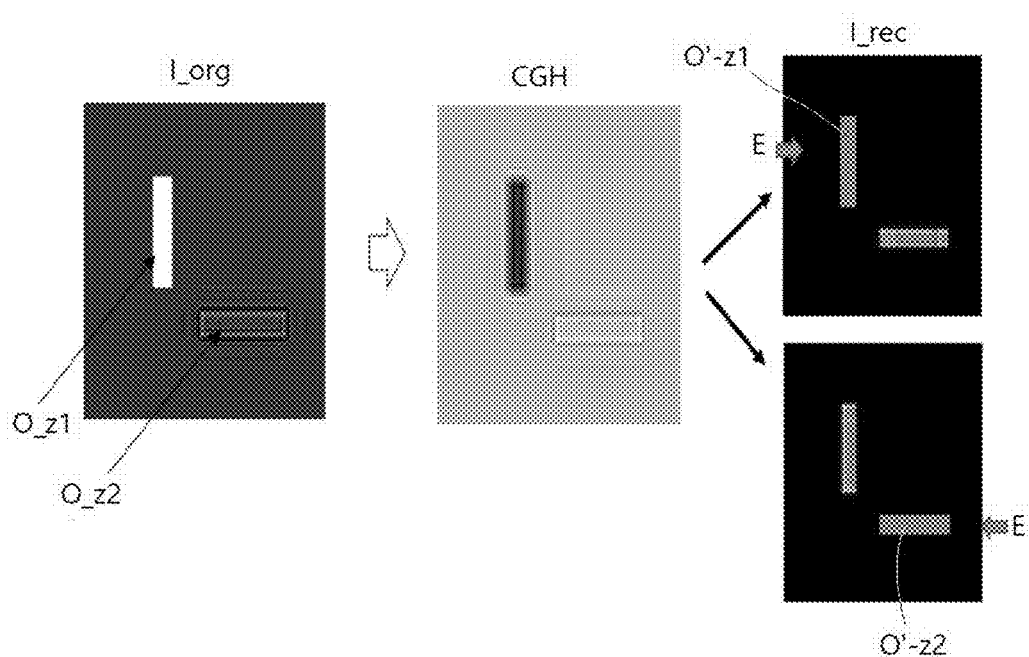
FIG. 4 shows a simulation result for verifying performance of a hologram data calculation according to the present invention.

FIG. 4 illustrates a simulation result for verifying the performance of the hologram data calculation according to the above-described present invention. It shows that an LF refocus complex amplitude image I_org including a rectangular object O_z1 with a depth z1 and a rectangular object O_z2 with a different depth z2 therefrom is numerically set and prepared, that the CGH is calculated based on the deep learning engine according to the present invention described above, and that when the generated CGH data is reconstructed according to the original object depth information, the original image I_org may be reproduced. In a reconstructed image I-rec according to a depth of an object, it may be seen that for each rectangular object with a different depth, only a rectangle O'_z1 or O'_z2 corresponding to a focus of an observer's eye E is clearly displayed.

The matters to be noted herein are as follows: Since the refocus image captured by the LF camera (for example, Lytro Camera) has only light intensity information, if the phase distribution is obtained through a phase retrieval extraction algorithm (130 in FIG. 2) the LF complex amplitude image may be obtained (150 in FIG. 2). Therefore, the original image may be reconstructed from the hologram generated by the deep learning engine (20 in FIG. 1) based on the complex amplitude image.

Figure 5:
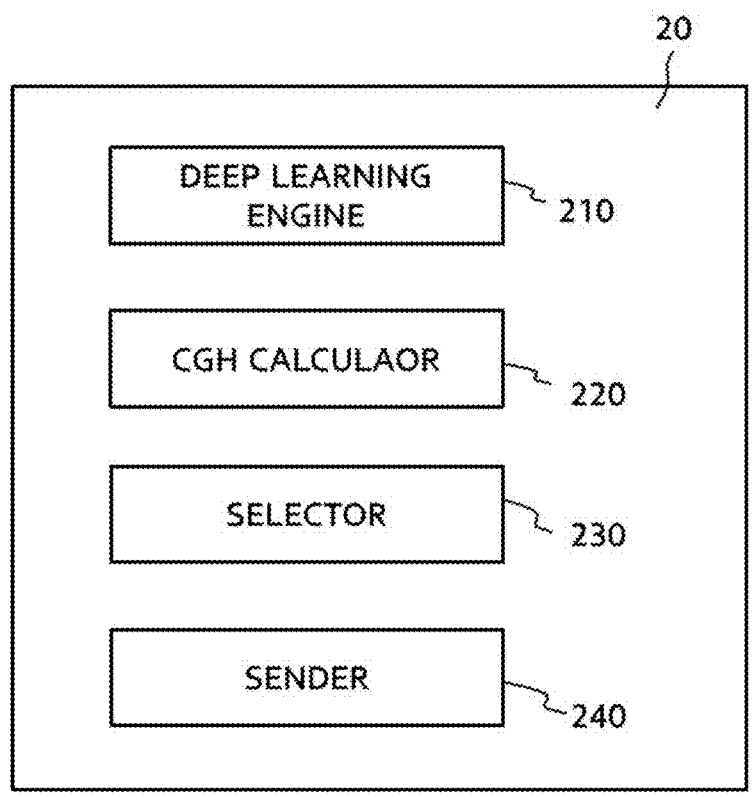
FIG. 5 is an additional configuration diagram of the hologram data calculator (20) of FIG. 3.

FIG. 5 illustrates an additional component of the hologram data calculator 20 (see FIG. 3) described above and illustrates an additional component for sending the hologram data generated by the CGH calculator 220 to the display terminal 30.

The hologram data calculator 20 includes a selector 230 that selects at least one pair of hologram data among hologram data generated by the CGH calculator 220 and stored in a memory (not illustrated); and a sender 240 that sends the selected data. Here, the selected two or more pairs of hologram data refer to hologram data selected to be suitable for each of the viewer's left and right eyes in consideration of a spatial position to be restored and an arrangement of an optical device.

Figure 6:
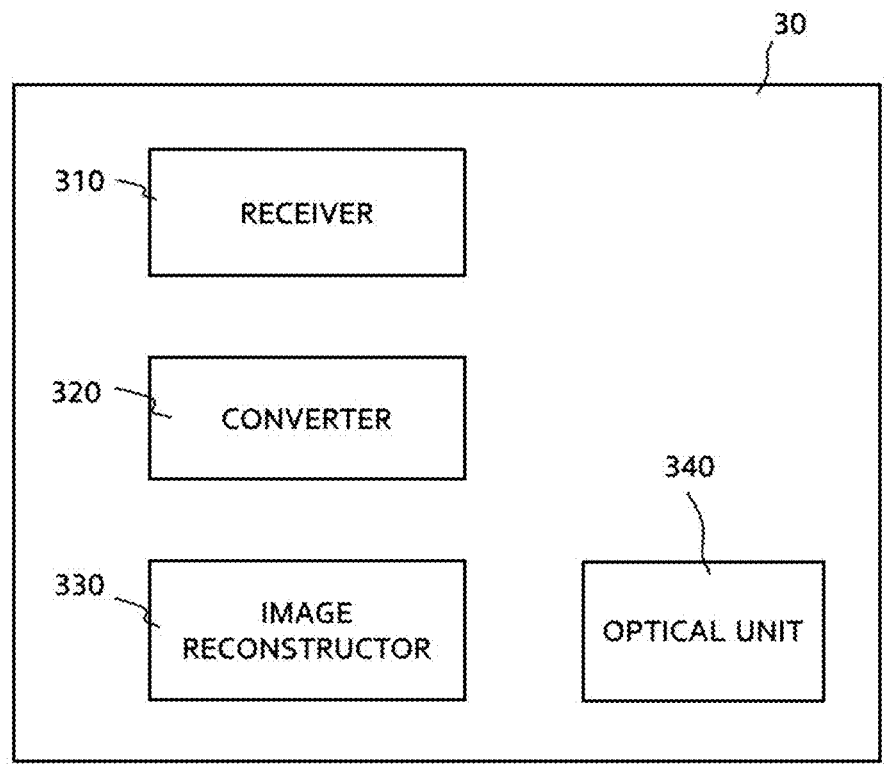
FIG. 6 is a configuration diagram of a holographic display terminal 30.

FIG. 6 is a configuration diagram of the holographic display terminal 30 for receiving data from the hologram data calculator 20 to display the data and interact with a user. Here, the terminal may be a personal portable mobile device, a tablet, an artificial intelligence (AI) display terminal, or the like.

The holographic display terminal 30 includes: a receiver 310 that receives the selected hologram data from a sender (240 in FIG. 5) of the hologram data calculator 20; a converter 320 that corrects (for example, data conversion or encoding) according to characteristics of a display terminal to be suitable for displaying the received hologram data file; and an image reconstructor 330 that uploads the selected hologram data to the display terminal and, in the uploaded state, illuminates the terminal with appropriately prepared light to reconstruct hologram content in a 3D space.

Alternatively, the converter 320 may be included in the hologram data calculator 20. In this case, the hologram data calculator 20 described above may additionally include a configuration for collecting hologram data that is easily sent to the display terminal.

In addition, the holographic display terminal 30 includes an optical unit 340 having a spatial light modulator (SLM) and an illuminator uniformly illuminating an active area of the SLM to reconstruct a holographic image. The illuminator may include a light source that radiates coherent light, and a beam guide that sufficiently enlarges the radiated light to a size of the active area and sends it to the active area with a uniform beam intensity. In addition, the optical unit 340 may include a field lens having optical transparency for converging a beam emitted through the terminal to a position where user's eyes are located. The field lens functions to send an optically reconstructed field to the vicinity of a position where viewer's eyes are located. The field lens is disposed in a structure that functions to focus the optically reconstructed holographic image in a front space or a back space of the SLM. The field lens may implement the above functions by using optical refraction or diffraction characteristics. In order to implement the holographic display terminal according to the present invention as the display suitable for the interaction with the user, the field lens preferably provides cross-convergence characteristics so that a 3D image may enter left and right eyes in a positive(+) z-space area (front space) which is a space where a user is located.

Figure 7:
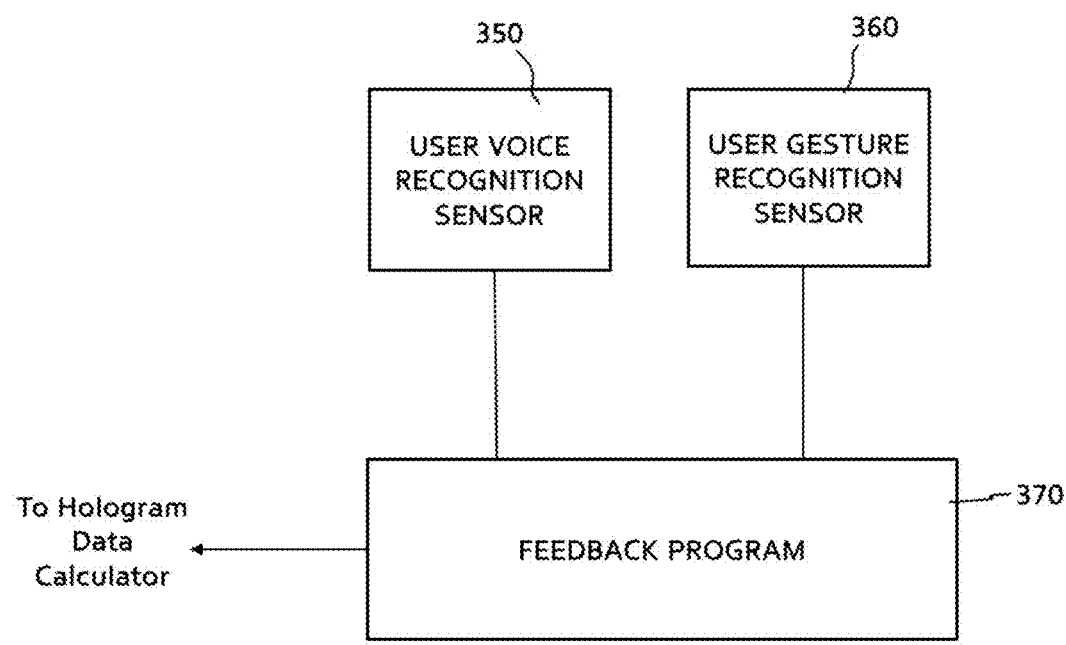
FIG. 7 is a configuration diagram of an interaction system between hologram content, which is included in the holographic display terminal (30), and a user.

FIG. 7 is a configuration diagram of an interaction system between hologram content and a user included in the holographic display terminal 30 of the present invention.

The display terminal 30 includes a sensor 350 that recognizes a user voice command and a sensor 360 that recognizes a user gesture command. Further, the display terminal 30 includes a feedback program 370 for selectively updating hologram data generated by the hologram data calculator 20 by using the user's recognized command information (voice information and/or gesture information). The feedback program 370 selects hologram data matching the recognized command information and fetches the selected hologram data from the hologram data calculator 20. In this case, the hologram data stands-by in a ready state after completion of pre-calculation of CGH so that the CGH is updated in real time for the given 3D content.

According to the present invention, it is possible to avoid the complicated algorithm and long-time content operation process for making the conventional hologram and to implement the high-quality image quality in the reconstructed image even when using the existing flat panel type holographic terminal while overcoming the limitations of the method of synthesizing digital hologram content from 3D data by the mathematical operation by the method of generating hologram content using a deep learning method. Therefore, it is possible to allow viewers to experience the ultimate realistic video in real time.

In particular, the present invention is suitable for applications such as personal portable mobile devices, tablets, AI display terminals, etc. because of enabling the high-speed hologram synthesis/computation processing and can implement the real-time data processing to increase immersion and 3D realism for viewers.

As described above, the configuration of the present invention has been described in detail through the exemplary embodiments of the present invention, but those of ordinary skill in the technical field to which the present invention belongs will be able to understand that the present invention can be implemented in a specific form different from the contents disclosed in the present specification without changing the technical idea or essential features of the present invention. Therefore, it should be understood that the above-described embodiments are exemplary in all aspects but are not limited thereto. The protective scope of the present invention is defined by the claims described below rather than the detailed description above, and all changes or modifications derived from the scope of the claims and their equivalent concepts should be interpreted as being included in the technical scope of the present invention.

What is claimed is:

1. A system for digital hologram synthesis and process using deep learning, comprising:
   a learning database (DB) constructed with input learning data as a light field (LF) refocus complex amplitude image converted from an LF refocus image and output learning data as a computer-generated hologram (CGH) generated based on an RGB-depth map;
   a hologram data calculator that synthesizes hologram data by training a deep learning engine using the learning DB; and
   a holographic display terminal that receives the hologram data from the hologram data calculator to display the received hologram data as hologram content.

2. The system of claim 1, wherein the deep learning engine of the hologram data calculator comprises a convolution neural network (CNN).

3. The system of claim 1, wherein the holographic display terminal displays the hologram content calculated by the hologram data calculator at a predetermined viewing angle, recognizes a voice and a gesture of a user, and interacts with the user using the recognized information.

4. The system of claim 1, further comprising a system that constructs the learning DB, wherein the system comprises:
   an image acquirer that acquires one of data in which 3D information of a selected scene or object is provided and a multi-view RGB color image;
   a phase distribution extractor that extracts a phase distribution to be used to generate the input learning data of the learning DB from an image output from the image acquirer when the image obtained by the image acquirer is a refocus image acquired in a refocusing state; and
   a CGH synthesizer that synthesizes the CGH to generate the output learning data of the learning DB.

5. The system of claim 4, further comprising a refocus image converter that obtains the refocus image from an original image acquired by the image acquirer when the image data acquired by the image acquirer is a non-refocus image.

6. The system of claim 4, further comprising:
   an image corrector that corrects at least one of a direction, a position, and a feature of the object in a selected area of the refocus image acquired by the image acquirer; and
   a file storage unit that stores the corrected image as a file in a predetermined format.

7. The system of claim 4, wherein the phase distribution extractor uses one of an iterative Fourier transform (IFT) algorithm and a deep learning engine to extract the phase distribution.

8. The system of claim 4, wherein the CGH synthesizer synthesizes the CGH using a format in an RGB-depth form as an input based on an RGB-depth map based FFT algorithm to generate output data of the learning DB.

9. The system of claim 1, wherein the hologram data calculator comprises:
   a deep learning engine that learns the input and output learning data of the learning DB; and
   a CGH calculator that calculates holographic data using the learned deep learning engine.

10. The system of claim 1, wherein the hologram data calculator comprises:
    a deep learning engine that is trained based on a CNN-based algorithm using the learning DB and uses the refocus complex amplitude image including both an intensity image and a phase image as input learning data during the training; and
    a CGH calculator that generates complex value hologram data for the input LF refocus image using the trained deep learning engine.

11. The system of claim 10, wherein the hologram data calculator further comprises a memory for storing the hologram data generated by the CGH calculator.

12. The system of claim 10, wherein the hologram data calculator comprises:
    a selector that selects at least one hologram data pair from among hologram data generated by the CGH calculator; and
    a sender that sends the selected data.

13. The system of claim 1, wherein the holographic display terminal comprises:
- a receiver that receives selected hologram data from the hologram data calculator;
- a converter that corrects a file of the received hologram data according to characteristics of the holographic display terminal; and
- an image reconstructor that uploads the selected hologram data to the display terminal and illuminates the terminal while the selected hologram data is in the uploaded state to reconstruct hologram content in a three-dimensional space to output an LF.

14. The system of claim 13, wherein the holographic display terminal further comprises an optical unit including a field lens that sends the reconstructed LF to the vicinity of viewer's eyes, and
the field lens provides a cross-convergence characteristic so that a 3D image enters left and right eyes in a positive z-space area (i.e., front space) which is a space in which a user is located.

15. The system of claim 1, wherein the holographic display terminal further comprises
an interaction system that performs an interaction between a user and the hologram content, and comprises a sensor for recognizing a user voice command, a sensor for recognizing a user gesture command, and a feedback program for selectively updating hologram data generated by the hologram data calculator by using at least one of the recognized user voice command and gesture command.

16. The system of claim 15, wherein the feedback program selects the hologram data matching at least one of the recognized voice command and gesture command and fetches the selected hologram data from the hologram data calculator.

17. A method of digital hologram synthesis and process using deep learning, comprising:
- constructing a learning database (DB) with input learning data as a light field (LF) refocus complex amplitude image converted from an LF refocus image and output learning data as a computer-generated hologram (CGH) generated based on an RGB-depth map;
- training a deep learning engine using the learning DB and synthesizing hologram data; and
- receiving the synthesized hologram data and displaying the received hologram data as hologram content.

18. The method of claim 17, wherein the synthesizing of the hologram data comprises
generating complex value hologram data for the input LF refocus image by using a deep learning engine that is trained based on a convolution neural network (CNN)-based algorithm using the learning DB and uses the refocus complex amplitude image including both an intensity image and a phase image as input learning data during the training.

19. The method of claim 17, wherein the displaying further comprises
recognizing a voice and a gesture of a user and interacting with the user by using the recognized information.

20. The method of claim 17, wherein the displaying comprises
performing an interaction between the hologram content and a user by using a sensor for recognizing one of a user voice command and a user gesture command and a feedback program selectively updating the synthesized hologram data using at least one of the recognized user voice command and gesture command, and
the feedback program selects the hologram data matching at least one of the recognized voice command and gesture command and fetches the selected hologram data from the synthesizing of the hologram data.

* * * * *